(12) United States Patent
Wang

(10) Patent No.: US 8,539,971 B2
(45) Date of Patent: Sep. 24, 2013

(54) AIR PASSAGEWAY SWITCHABLE PUMP HEAD FOR AIR PUMP

(75) Inventor: Lopin Wang, Taichung (TW)

(73) Assignee: Beto Engineering and Marketing Co., Ltd., Taichung (TW)

(*) Notice: Subject to any disclaimer, the term of this patent is extended or adjusted under 35 U.S.C. 154(b) by 167 days.

(21) Appl. No.: 13/309,344

(22) Filed: Dec. 1, 2011

(65) Prior Publication Data

US 2013/0087228 A1    Apr. 11, 2013

(30) Foreign Application Priority Data

Oct. 7, 2011    (TW) .............................. 100136567 A

(51) Int. Cl.
*F16K 15/20*        (2006.01)

(52) U.S. Cl.
USPC ...................... 137/231; 137/223; 137/625.48

(58) Field of Classification Search
USPC .......................... 137/223, 231, 625.13, 625.48
See application file for complete search history.

(56) References Cited

U.S. PATENT DOCUMENTS

| | | | | |
|---|---|---|---|---|
| 2,716,998 A * | 9/1955 | Knasko | .......................... | 137/231 |
| 4,078,728 A * | 3/1978 | Nordeen | ........................ | 239/586 |
| 5,666,990 A * | 9/1997 | Wu | ................................ | 137/223 |
| 5,683,234 A * | 11/1997 | Chuang et al. | ................. | 417/531 |
| 5,819,781 A * | 10/1998 | Wu | ................................ | 137/231 |
| 7,178,549 B2 | 2/2007 | Wu et al. | | |
| 7,562,671 B2 * | 7/2009 | Wang | ............................ | 137/231 |
| 8,156,955 B2 * | 4/2012 | Wang | ............................ | 137/231 |
| 8,360,090 B2 * | 1/2013 | Wang | ............................ | 137/223 |
| 8,402,987 B2 * | 3/2013 | Wang | ............................ | 137/223 |
| 2003/0221724 A1 * | 12/2003 | Wang | ............................ | 137/223 |
| 2005/0072479 A1 * | 4/2005 | Wuollet et al. | ........... | 137/625.48 |

\* cited by examiner

*Primary Examiner* — John Rivell
*Assistant Examiner* — R. K. Arundale
(74) *Attorney, Agent, or Firm* — Muncy, Geissler, Olds & Lowe, PLLC

(57) ABSTRACT

An air passageway switchable pump head includes a housing defining a first air outlet passageway, an air intake passageway and a second air outlet passageway, a connection member mounted in the housing for connection to a valve, a switch valve consisting of a valve seat, a valve body and a spring member, and an operating member mounted at one end of the housing and operable to move the switch valve between a first position where a first air passageway of the switch valve is closed, allowing air communication between a second air passageway of the switch valve and the second air outlet passageway, and a second position where the valve body is moved toward the valve seat and closed on the valve seat to block the second air passageway of the switch valve and the first air passageway of the switch valve is opened.

10 Claims, 5 Drawing Sheets

AIR PASSAGEWAY SWITCHABLE PUMP HEAD FOR AIR PUMP

BACKGROUND OF THE INVENTION

1. Field of the Invention

The present invention relates to air pumps and more particularly, to an air passageway switchable pump head for air pump.

2. Description of the Related Art

U.S. Pat. No. 7,178,549 (equivalent to Taiwan Patent 1246568) discloses a pump head for air pump, entitled "Valve coupling device for pump", which comprises a body including a first end, a second end, and a transverse hole between the first end and the second end, a first nozzle being mounted in the first end of the body, the first nozzle being adapted to couple with a valve of a first type, a compartment being defined in the second end of the body and including a first chamber and a second chamber, the first chamber being in communication with the transverse hole, the second chamber being in communication with the transverse hole; a switch member pivotally extending through the transverse hole of the body, the switch member including a first end and a second end and being pivotable between a first position and a second position, the switch member further including a first cam section and a second cam section, a second nozzle being mounted in the first end of the switch member and in communication with the second chamber, the second nozzle being adapted to couple with a valve of a second type different from the first type; wherein when the switch member is in the first position, the first chamber is in communication with the first nozzle under the action of the first cam section and the second chamber is blocked under the action of the second cam section; and wherein when the switch member is in the second position, the second chamber is in communication with the second nozzle under the action of the second cam section and the first chamber is blocked under the action of the first cam section.

The body of the aforesaid prior art design has a small size and is equipped with a nozzle, it is more convenient for operation when compared to a design having two holes selectively connectable to an air valve. However, the aforesaid prior art design has a complicated structure and a high manufacturing cost. Further, when operating the nozzles, the switch member may be moved accidentally, causing the chambers to be opened or closed abnormally and affecting pumping smoothness.

Therefore, it is desirable to provide a pump head or valve coupling device for air pump, which eliminates the aforesaid drawbacks.

SUMMARY OF THE INVENTION

The present invention has been accomplished under the circumstances in view. It is the main object of the present invention to provide an air passageway switchable pump head for air pump, which has a simple structure and facilitates smooth operation.

To achieve this and other objects of the present invention, an air passageway switchable pump head for air pump comprises a housing, a connection member, a switch valve and an operating member. The housing comprises an elongated accommodation space, a first air outlet passageway located on one end of the elongated accommodation space, an air intake passageway located on one lateral side thereof in communication with the elongated accommodation space, and a second air outlet passageway located on the same lateral side between the air intake passageway and the first air outlet passageway and kept in communication with the elongated accommodation space. The connection member is accommodated in the elongated accommodation space of the housing and adapted for connection to an air valve of an inflatable object to be inflated. The connection member comprises a through hole kept in communication with the first air outlet passageway. The switch valve is mounted in the housing and kept in communication with the air intake passageway, the first air outlet passageway and the second air outlet passageway. Further, the switch valve comprises a valve seat abutted against the connection member, a valve body, and a spring member. The valve seat comprises a valve hole located on the center thereof and aimed at the through hole of the connection member to form a first air passageway of the switch valve in communication with the first air outlet passageway of the housing. The valve body is axially movably accommodated in the elongated accommodation space of the housing, comprising a pin facing toward the valve hole of the valve seat and adapted for closing the valve hole to block the first air outlet passageway of the housing. The spring member is stopped between the valve seat and the valve body to keep the valve body and the valve seat apart and to form a second air passageway of the switch valve between the valve body and the valve seat. The operating member is mounted at one end of the housing opposite to the first air outlet passageway and operable to move the switch valve between a first position where the pin closes the valve hole to block the first air passageway, allowing air communication between the second air passageway of the switch valve and the second air outlet passageway, and a second position where the valve body is moved toward the valve seat and closed on the valve seat to block the second air passageway of the switch valve, and at the same time, the pin is separated from the valve hole to open the first air passageway of the switch valve.

DETAILED DESCRIPTION OF THE INVENTION

Figure 1:
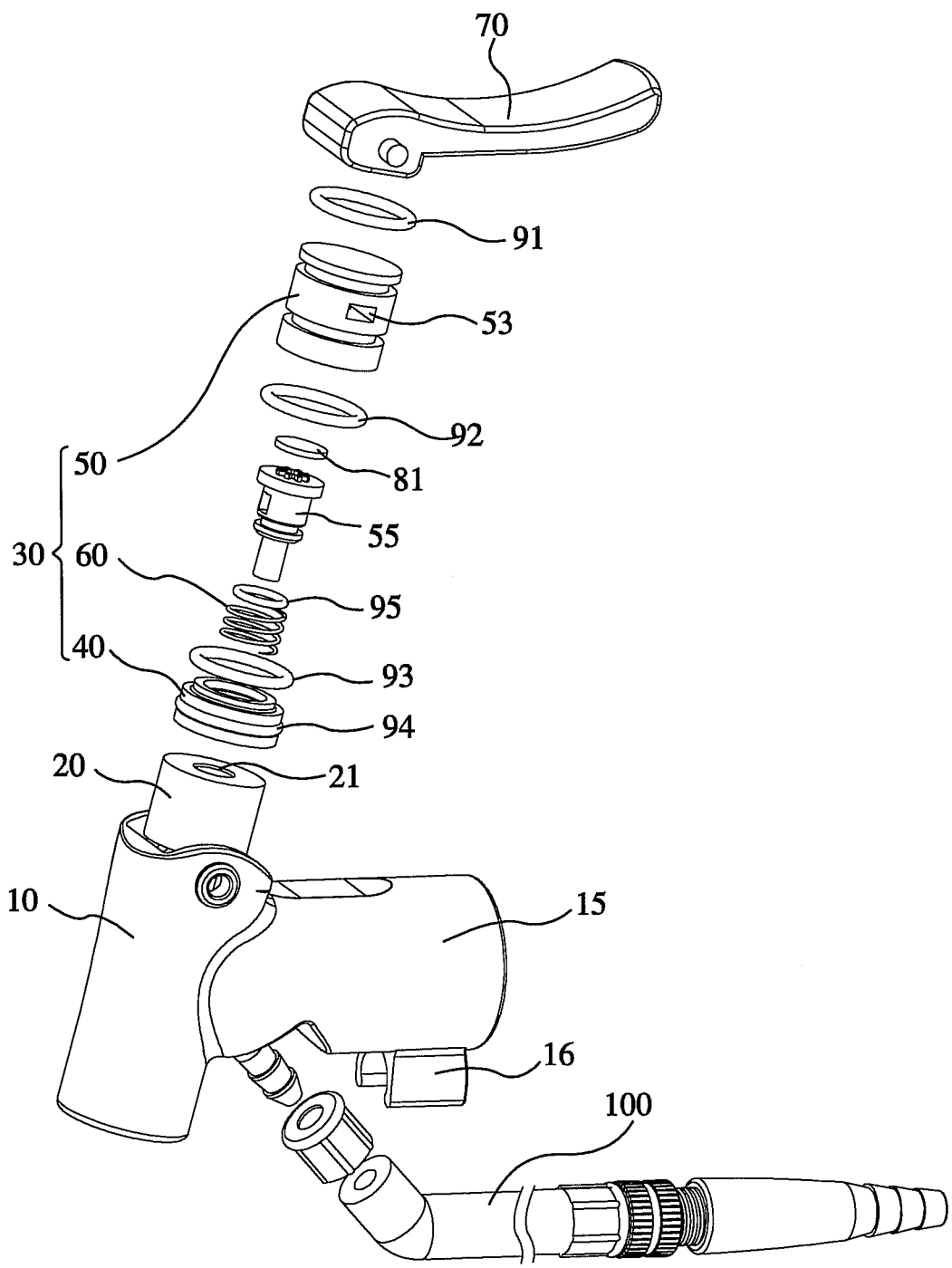
FIG. 1 is an exploded view of an air passageway switchable pump head for air pump in accordance with the present invention.
Figure 2:
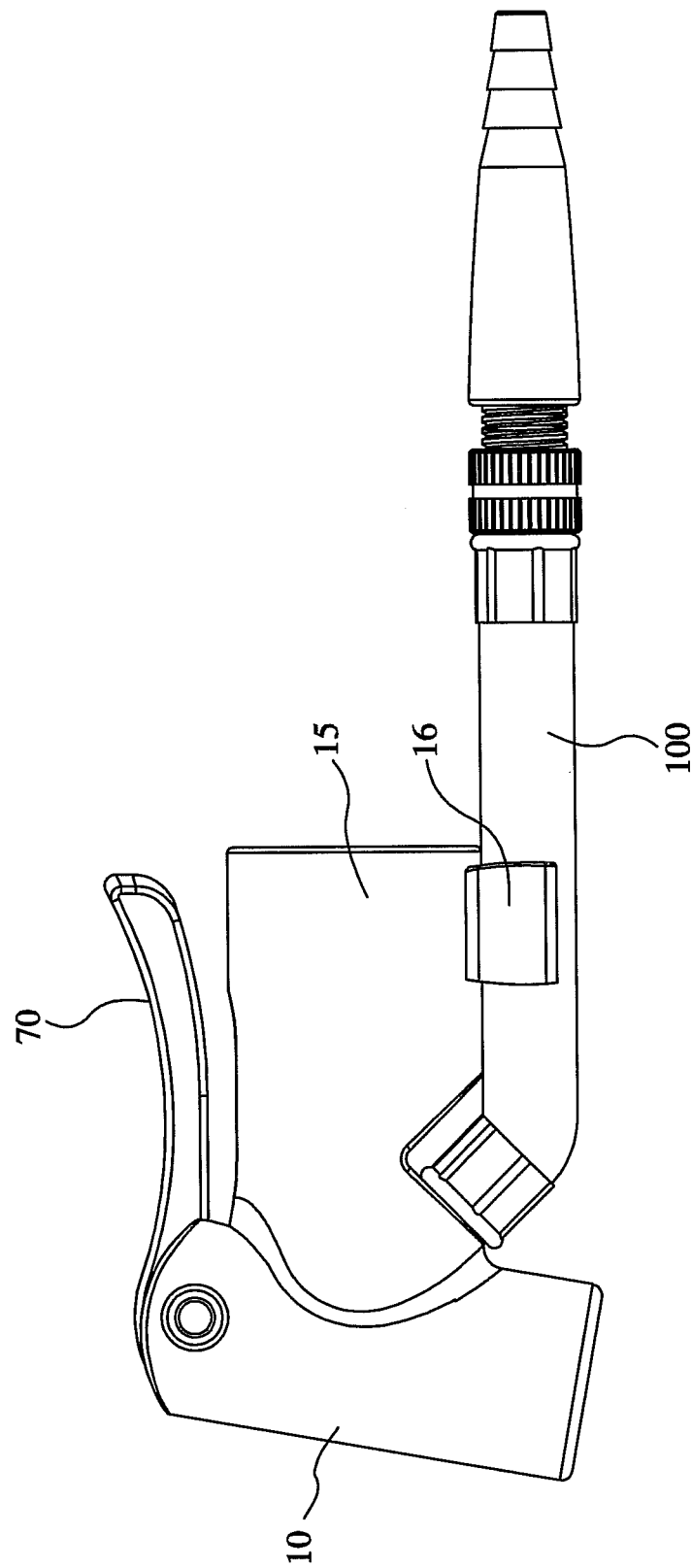
FIG. 2 is a front elevation of the air passageway switchable pump head for air pump in accordance with the present invention.
Figure 3:
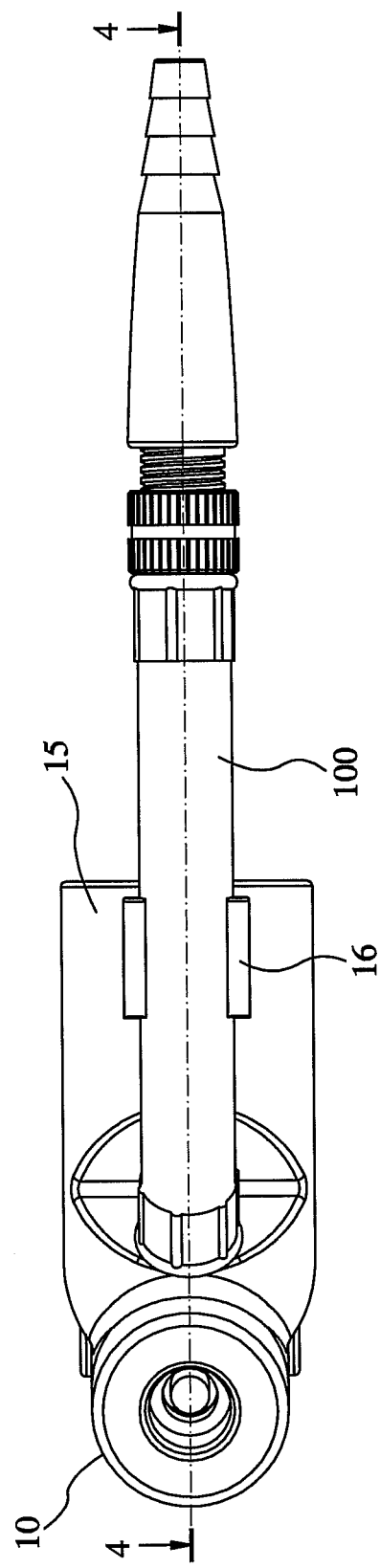
FIG. 3 is a bottom elevation of the air passageway switchable pump head for air pump in accordance with the present invention.

Referring to FIGS. 1-5, an air passageway switchable pump head for air pump in accordance with the present invention is shown comprising a housing 10, a connection member 20, a switch valve 30, and a operating member 70.

The housing 10 defines therein an elongated accommodation space 11, a first air outlet passageway 12 located on one end of the elongated accommodation space 11, an air intake passageway 13 located on one lateral side thereof in communication with the elongated accommodation space 11, and a second air outlet passageway 14 located on the same lateral side between the air intake passageway 13 and the first air outlet passageway 12 and kept in communication with the elongated accommodation space 11.

The connection member 20 defines a through hole 21. The connection member 20 is accommodated in the elongated accommodation space 11 of the housing 10, keeping the through hole 21 in communication with the first air outlet passageway 12. Further, the connection member 20 is adapted for connection to an air valve of an inflatable object (not shown) to be inflated.

The switch valve 30 is mounted in the housing 10 and kept in communication with the air intake passageway 13, the first air outlet passageway 12 and the second air outlet passageway 14.

The operating member 70 is mounted at one end of the housing 10 opposite to the first air outlet passageway 12, and operable by an external force to move the switch valve 30.

Further, the switch valve 30 comprises a valve seat 40, a valve body 50 and an elastic member 60.

The valve seat 40 is abutted against the connection member 20, comprising a valve hole 41 located on the center. The valve hole 41 is aimed at the through hole 21 of the connection member 20, forming a first air passageway 31 of the switch valve 30 and kept in communication with the first air outlet passageway 12 of the housing 10.

The valve body 50 is axially movably accommodated in the elongated accommodation space 11 of the housing 10, comprising a pin 55 facing toward the valve hole 41 of the valve seat 40 and adapted for closing the valve hole 41 to block the first air outlet passageway 12 of the housing 10.

The elastic member 60 has its one end stopped at the valve seat 40 and its other end stopped at the valve body 50 to keep the valve body 50 and the valve seat 40 normally apart, enabling a second air passageway 32 of the switch valve 30 to be formed between the valve body 50 and the valve seat 40. At this time, the pill 55 closes the valve hole 41 to block the first air passageway 31, allowing air communication between the second air passageway 32 of the switch valve 30 and the second air outlet passageway 14 and keeping the valve body 50 in contact with the operating member 70.

When the operating member 70 is biased by an external biasing force to move the valve body 50 toward the valve seat 40, the valve body 50 and the valve seat 40 are closed to block the second air passageway 32 of the switch valve 30. At this time, the pin 55 is separated from the valve hole 41, thereby opening the first air passageway 31 of the switch valve 30 (see FIG. 5).

The operation of the air passageway switchable pump head for air pump of the present invention is outlined hereinafter.

Figure 4:
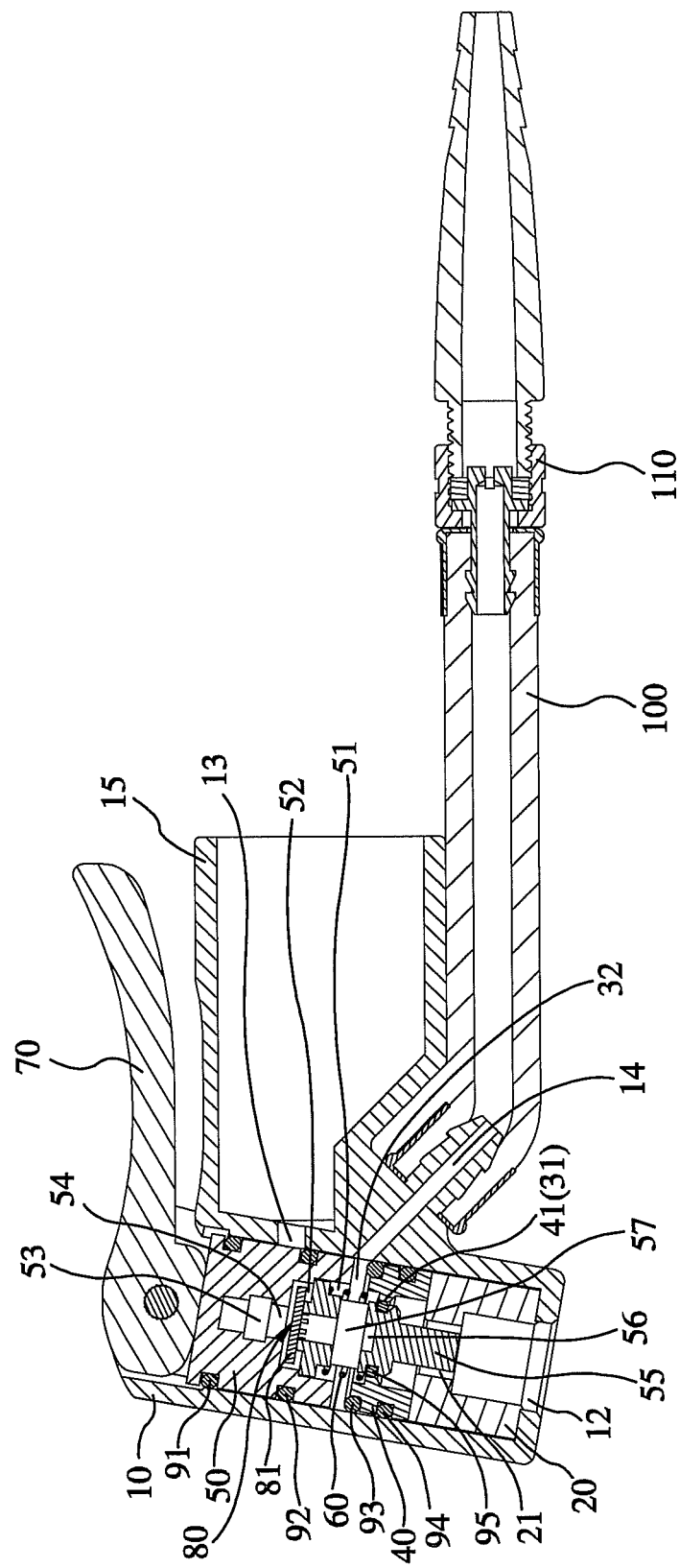
FIG. 4 is a sectional view taken along line 4-4 of FIG. 3, illustrating a status of use of the air passageway switchable pump head.

As shown in FIG. 4, when the operating member 70 is not operated, the pin 40 closes the valve hole 41 to block the first air passageway 31. At this time, the elastic member 60 keeps the valve body 50 away from the valve seat 40, thereby opening the second air passageway 32 in communication with the second air outlet passageway 14. At this time, the air intake passageway 13 is not connected to the air output end of the air pump (not shown). Further, the housing 10 comprises a coupling end portion 15 around the air intake passageway 13 for connection to the pump cylinder of an air pump (not shown). At this time, outside air goes through the air intake passageway 13 into the elongated accommodation space 11, and then through the valve body 50 to the second air passageway 32, and then through the second air outlet passageway 14 to the outside of the housing 10.

Figure 5:
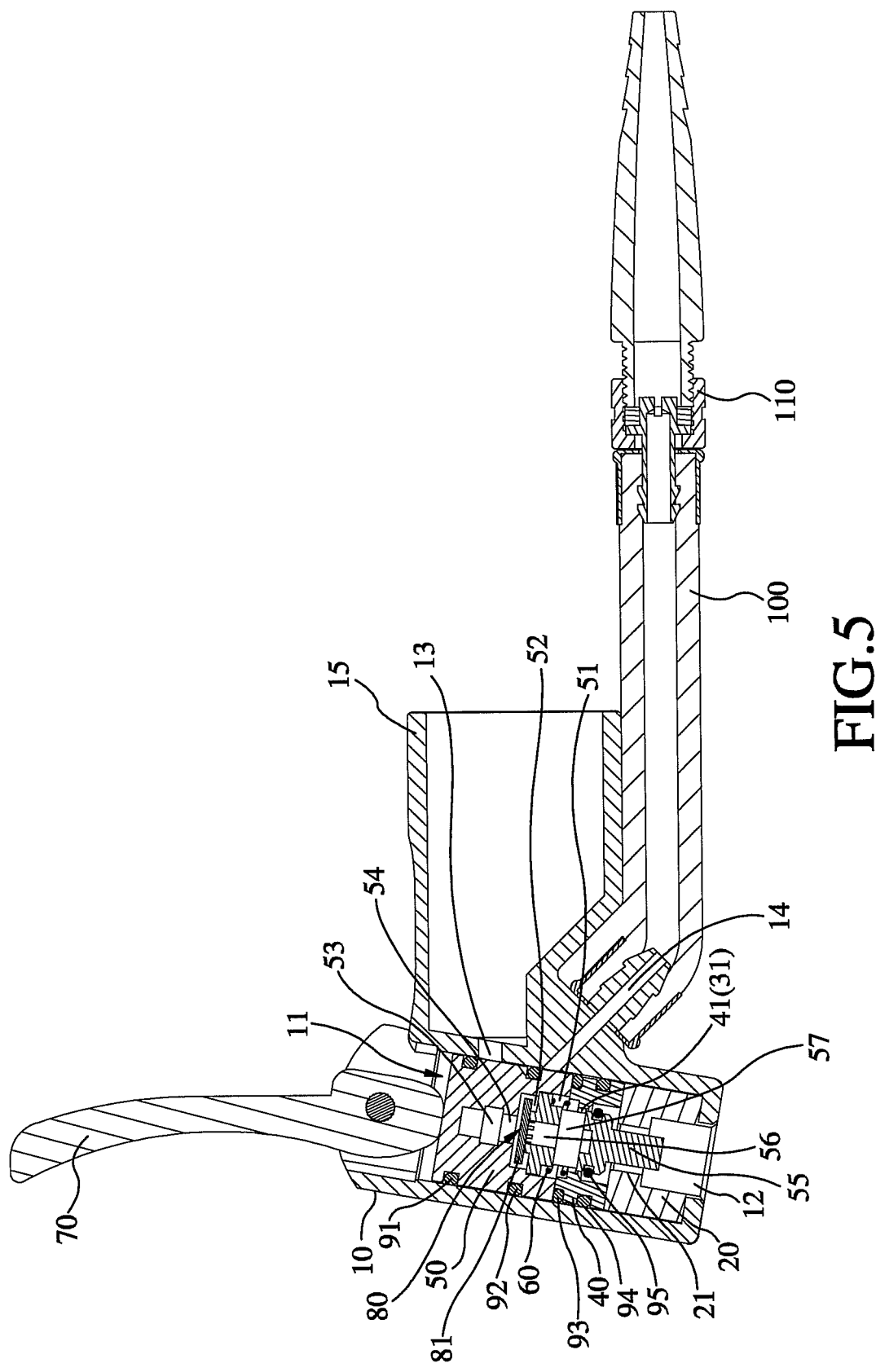
FIG. 5 is similar to FIG. 4, illustrating another status of use of the air passageway switchable pump head.

As shown in FIG. 5, when biasing the operating member 70 to move the valve body 50 toward the valve seat 40, the valve body 50 and the valve seat 40 are closed to block the second air passageway 32. At this time, the pin 55 is moved away from the valve hole 41 to open the first air passageway 31, allowing outside air to go through the air intake passageway 13 into the inside of the housing 10 and then through the valve body 50 to the first air passageway 31 and then through the first air outlet passageway 12 to the outside of the housing 10.

By means of operating the operating member 70 to press the switch valve 30, the switch valve 30 is forced to switch the air passageway. This operation is quite simple. Further, the structure of the pump head is also simple.

Further, in order to prevent reverse flow of air, a check valve may be used and set in the front end of the air intake passageway 13. However, setting a check valve in the front end of the air intake passageway 13 will shorten the effective stroke of the air pump. To avoid this problem, the invention has a check valve 80 be set in the valve body 50 of the switch valve 30. Due to installation of the check valve 80 in the valve body 50 of the switch valve 30, the pin 55 and the valve body 50 are separately arranged. As illustrated, the valve body 50 comprises a recessed hole 51 facing toward the valve seat 40. The pin 55 is mounted in the recessed hole 51 of the valve body 50. Further, an accommodation space 52 is defined between the pin 55 and the recessed hole 51. Further, the valve body 50 comprises a through hole 53 located on one lateral side thereof, and an air passageway 54 in communication between the through hole 53 and the accommodation space 52. Further, a valve flap 81 is accommodated in the accommodation space 52 and adapted for closing the air passageway 54. The pin 55 defines therein at least one flow passageway in communication between the accommodation space 52 and the second air passageway 32. According to this embodiment, the pin 55 comprises a groove 56 axially located on the center, and a side through hole 57 disposed in communication with the groove 56 and forming with the groove 56 the aforesaid flow passageway in communication between the accommodation space 52 and the second air passageway 32. In other words, if the check valve 80 is mounted in the front end of the air intake passageway 13, the pin 55 can be formed integral with the valve body 50. Further, the elastic member 60 in this embodiment is a coil spring, having its one end stopped at the valve seat 40 and its other end stopped at the pin 55.

Further, to avoid air leakage, seal rings 91 and 92 are respectively mounted in the top and bottom ends of the through hole 53 of the valve body 50. The seal ring 91 is disposed at an outer side relative to the air intake passageway 13 to prevent leakage of air out of the accommodation space 11. The seal ring 92 is set between the air intake passageway 13 and the second air outlet passageway 14. During movement of the valve body 50, the upper and lower limit positions of the seal ring 92 are kept within the space between the air intake passageway 13 and the second air outlet passageway 14 so that the seal ring 92 can isolate the air intake passageway 13 and the second air outlet passageway 14. Another two seal rings 93 and 94 are respectively mounted in the valve seat 40. The seal ring 93 is mounted on one end of the valve seat 40 and partially protruding over the end face of the valve seat 40. Thus, when the valve body 50 and the valve seat 40 are closed together, the seal ring 93 is compressed, achieving airtightness. The seal ring 94 is mounted on the middle part of the valve seat 40 to keep the space defined by the valve seat 40 and the inside wall of the accommodation space 11 of the housing 10 in an airtight status.

Further, a flexible tube 100 is connected to the second air outlet passageway 14 of the housing 10. The distal end of the flexible tube 100 is connected to an air valve connector 110. Further, a clamp 16 is provided at the coupling end portion 15 of the housing 10 for securing the flexible tube 100. Thus, operating the flexible tube 100 does not interfere with the air passageway switching operation. Thus, the user can switch the switch valve 30 accurately.

Further, the operating member 70 in this embodiment is a pressure lever pivotally mounted at one end of the housing 10 and operable to switch the switch valve 30. Alternatively, the operating member 70 can be a rotary knob rotatable to switch the switch valve 30. In this case, the contact surfaces of the operating member 70 and the switch valve 30 are respectively made in the form of a convex surface and a concave surface. By means of rotating the operating member, the cone surface is forced against the concave surface, causing the switch valve 30 to perform a switching action.

Further, the connection member 20 is a cylindrical member made of an elastic material. The through hole 21 of the connection member 20 is located on the bottom side. The distal end of the pin 55 of the valve body 50 reaches the middle part of the through hole 21, forming an American type (Schrader) air valve connector. Of course, the invention is also applicable to a French type (Presta) air valve connector. Further, the air valve connector 110 of the flexible tube 100 can also be made subject to American type (Schrader) or French type (Presta) specifications. Further, the coupling end portion 15 of the housing 10 can be made in the form of a plug for the connection of a flexible tube.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An air passageway switchable pump head of an air pump, comprising:
    a housing comprising an elongated accommodation space, a first air outlet passageway located on one end of said elongated accommodation space, an air intake passageway located on one lateral side thereof in communication with said elongated accommodation space, and a second air outlet passageway located on the same lateral side between said air intake passageway and said first air outlet passageway and kept in communication with said elongated accommodation space;
    a connection member accommodated in said elongated accommodation space of said housing and adapted for connection to an air valve of an inflatable object to be inflated, said connection member comprising a through hole kept in communication with said first air outlet passageway;
    a switch valve mounted in said housing and kept in communication with said air intake passageway, said first air outlet passageway and said second air outlet passageway, said switch valve comprising a valve seat abutted against said connection member, said valve seat comprising a valve hole located on the center thereof and aimed at the through hole of said connection member to form a first air passageway of said switch valve in communication with said first air outlet passageway of said housing, a valve body axially movably accommodated in said elongated accommodation space of said housing, said valve body comprising a pin facing toward said valve hole of said valve seat and adapted for closing said valve hole to block said first air outlet passageway of said housing, a spring member stopped between said valve seat and said valve body to keep said valve body and said valve seat apart and to form a second air passageway of said switch valve between said valve body and said valve seat; and
    a operating member mounted at one end of said housing opposite to said first air outlet passageway and operable to move said switch valve between a first position where said pin closes said valve hole to block said first air passageway, allowing air communication between said second air passageway of said switch valve and said second air outlet passageway, and a second position where said valve body is moved toward said valve seat and closed on said valve seat to block said second air passageway of said switch valve, and at the same time, said pin is separated from said valve hole to open said first air passageway of said switch valve.

2. The air passageway switchable pump head as claimed in claim 1, wherein said pin is mounted with a seal ring adapted for sealing said valve hole of said valve seat when said pin blocks said valve hole of said valve seat.

3. The air passageway switchable pump head as claimed in claim 1, wherein said switch valve further comprises a check valve adapted for limiting the flowing direction of the intake air coming through said air intake passageway toward said first air outlet passageway or said second air outlet passageway.

4. The air passageway switchable pump head as claimed in claim 3, wherein said valve body and said pin of said switch valve are separately arranged; said valve body comprises a recessed hole facing toward said valve seat, a through hole located on one lateral side thereof, an accommodation space defined between said pin and said recessed hole and an air passageway disposed in communication between the through hole and accommodation space of said valve body; a valve flap is accommodated in the accommodation space of said valve body and adapted for closing the air passageway of said valve body; said pin defines therein at least one flow passageway in communication between the accommodation space of said valve body and said second air passageway of said switch valve.

5. The air passageway switchable pump head as claimed in claim 4, wherein said pin comprises a groove axially located on the center thereof, and a side through hole disposed in communication with said groove and forming with said groove said at least one flow passageway in communication between the accommodation space of said valve body and said second air passageway of said switch valve.

6. The air passageway switchable pump head as claimed in claim 1, wherein said housing further comprises a flexible tube connected to said second air outlet passageway, said flexible tube comprising an air valve connector located on a distal end thereof.

7. The air passageway switchable pump head as claimed in claim 1, wherein said housing comprises a coupling end portion around said air intake passageway for connection to a pump cylinder of an air pump.

8. The air passageway switchable pump head as claimed in claim 1, wherein said housing comprises a coupling end portion around said air intake passageway for the connection of a flexible tube.

9. The air passageway switchable pump head as claimed in claim 1, wherein said valve body comprises a first seal ring and a second seal ring respectively mounted in top and bottom ends of the through hole thereof, said first seal ring being disposed at an outer side relative to said air intake passageway to prevent leakage of air out of the accommodation space of said housing, said second seal ring being set between said air intake passageway and said second air outlet passageway to isolate said air intake passageway and said second air outlet passageway.

10. The air passageway switchable pump head as claimed in claim 1, wherein said valve seat comprises a first seal ring mounted on one end thereof and partially protruding over an adjacent end face of said valve seat and compressible to achieve airtightness when said valve body and said valve seat are closed together, and a second seal ring mounted on a middle part thereof to keep the space defined by said valve seat and the inside wall of the accommodation space of said housing in an airtight status.

\* \* \* \* \*